(12) United States Patent
Blankespoor et al.

(10) Patent No.: US 9,833,899 B1
(45) Date of Patent: Dec. 5, 2017

(54) ADAPTIVE RESPONSE TO LOAD

(71) Applicant: Google Inc., Mountain View, CA (US)

(72) Inventors: Kevin Blankespoor, Mountain View, CA (US); Alexander Douglas Perkins, Mountain View, CA (US); Marco da Silva, Mountain View, CA (US); Shervin Talebinejad, Mountain View, CA (US)

(73) Assignee: Boston Dynamics, Inc., Mountain View, CA (US)

( * ) Notice: Subject to any disclaimer, the term of this patent is extended or adjusted under 35 U.S.C. 154(b) by 67 days.

(21) Appl. No.: 14/676,899

(22) Filed: Apr. 2, 2015

(51) Int. Cl.
*B25J 9/16* (2006.01)
*B62D 57/032* (2006.01)

(52) U.S. Cl.
CPC .......... *B25J 9/1633* (2013.01); *B62D 57/032* (2013.01); *Y10S 901/01* (2013.01)

(58) Field of Classification Search
CPC ................. B25J 9/1633; B25J 9/1638; G05D 2201/0217; B62D 57/032; B62D 57/024; Y10S 901/01
See application file for complete search history.

(56) References Cited

U.S. PATENT DOCUMENTS

| | | | |
|---|---|---|---|
| 5,739,655 A * | 4/1998 | Torii ...................... | B62D 57/00 180/8.6 |
| 8,688,273 B2 | 4/2014 | Lee et al. | |
| 8,805,584 B2 | 8/2014 | Yamane | |
| 8,855,821 B2 | 10/2014 | Seo et al. | |
| 2005/0165507 A1* | 7/2005 | Shimizu ............... | B62D 57/032 700/245 |
| 2012/0158182 A1 | 6/2012 | Lee et al. | |
| 2012/0197439 A1* | 8/2012 | Wang ..................... | B25J 9/1689 700/259 |
| 2012/0310412 A1* | 12/2012 | Seo ........................ | B25J 9/0006 700/254 |
| 2013/0158712 A1 | 6/2013 | Lee et al. | |

FOREIGN PATENT DOCUMENTS

KR 101438968 B1 * 9/2014

* cited by examiner

*Primary Examiner* — Spencer D Patton
(74) *Attorney, Agent, or Firm* — Honigman Miller Schwartz and Cohn LLP

(57) ABSTRACT

An example implementation includes determining a force allocation for at least one foot of a legged robotic device, where the legged robotic device includes two feet coupled to two legs extending from a body of the legged robotic device. The implementation also includes determining a change in mass distribution of the legged robotic device, and based on the determined change in mass distribution, determining a force and a torque on the body of the legged robotic device with respect to a ground surface. The implementation also includes updating the determined force allocation for the at least one foot of the two feet based on the determined force and torque. The implementation also includes causing the at least one foot to act on the ground surface based on the updated force allocation.

13 Claims, 7 Drawing Sheets

ADAPTIVE RESPONSE TO LOAD

GOVERNMENT LICENSE RIGHTS

This invention was made with U.S. Government support under Contract No. HR00011-10-C-0025 awarded by DARPA. The Government may have certain rights with regard to the invention.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to controlling a legged robotic device. Specifically, implementations described herein may allow for efficient operation of a legged robotic device that encounters a change in its weight and mass distribution. As the weight and mass distribution of the legged robotic device changes, the legged robotic device may adapt various gait parameters, such as the vertical force applied to the feet, and shear forces in the forward and lateral directions, as examples. These as well as other aspects, advantages, and alternatives will become apparent to those of ordinary skill in the art by reading the following detailed description, with reference where appropriate to the accompanying drawings.

A first example implementation includes (i) determining a force allocation for at least one foot of the legged robotic device, where the legged robotic device includes two legs extending from a body of the legged robotic device, where the two legs are coupled to two feet, and where at least one foot of the two feet is in contact with a ground surface, (ii) determining a change in mass distribution of the legged robotic device, (iii) based on the determined change in mass distribution, determining a force and a torque on the body of the legged robotic device with respect to the ground surface, where the determined torque includes at least one of a pitch component and a roll component, (iv) based on the determined force and torque, updating the determined force allocation for the at least one foot of the two feet, and (v) causing the at least one foot to act on the ground surface based on the updated force allocation.

In a second example implementation, a non-transitory computer-readable storage medium having stored thereon instructions, that when executed by one or more processors, cause a legged robotic device to carry out operations. The operations include (i) determining a force allocation for at least one foot of the legged robotic device, where the legged robotic device includes two legs extending from a body of the legged robotic device, where the two legs are coupled to two feet, and where at least one foot of the two feet is in contact with a ground surface, (ii) determining a change in mass distribution of the legged robotic device, (iii) based on the determined change in mass distribution, determining a force and a torque on the body of the legged robotic device with respect to the ground surface, where the determined torque includes at least one of a pitch component and a roll component, (iv) based on the determined force and torque, updating the determined force allocation for the at least one foot of the two feet, and (v) causing the at least one foot to act on the ground surface based on the updated force allocation.

A third example implementation includes a robotic system having (i) two legs connected to a main body, (ii) two feet coupled to the two legs, where at least one foot of the two feet is in contact with a ground surface, (iii) one or more processors, (iv) a plurality of actuators, and (v) data storage including program instructions stored thereon that when executed by the one or more processors of the robotic system, cause the robotic system to carry out operations. The operations include (i) determining a force allocation for the at least one foot of the two feet of the robotic system, (ii) determining a change in mass distribution of the robotic system, (iii) based on the determined change in mass distribution, determining a force and a torque on the body of the robotic system with respect to the ground surface, where the determined torque includes at least one of a pitch component and a roll component, (iv) based on the determined force and torque, updating the determined force allocation for the at least one foot of the two feet, and (v) causing the at least one foot to act on the ground surface based on the updated force allocation.

A fourth example implementation may include a system. The system may include (i) a means for determining a force allocation for at least one foot of the legged robotic device, where the legged robotic device includes two legs extending from a body of the legged robotic device, where the two legs are coupled to two feet, and where at least one foot of the two feet is in contact with a ground surface, (ii) a means for determining a change in mass distribution of the legged robotic device, (iii) based on the determined change in mass distribution, a means for determining a force and a torque on the body of the legged robotic device with respect to the ground surface, where the determined torque includes at least one of a pitch component and a roll component, (iv) based on the determined force and torque, a means for updating the determined force allocation for the at least one foot of the two feet, and (v) a means for causing the at least one foot to act on the ground surface based on the updated force allocation.

This summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

DETAILED DESCRIPTION

Figure 1:
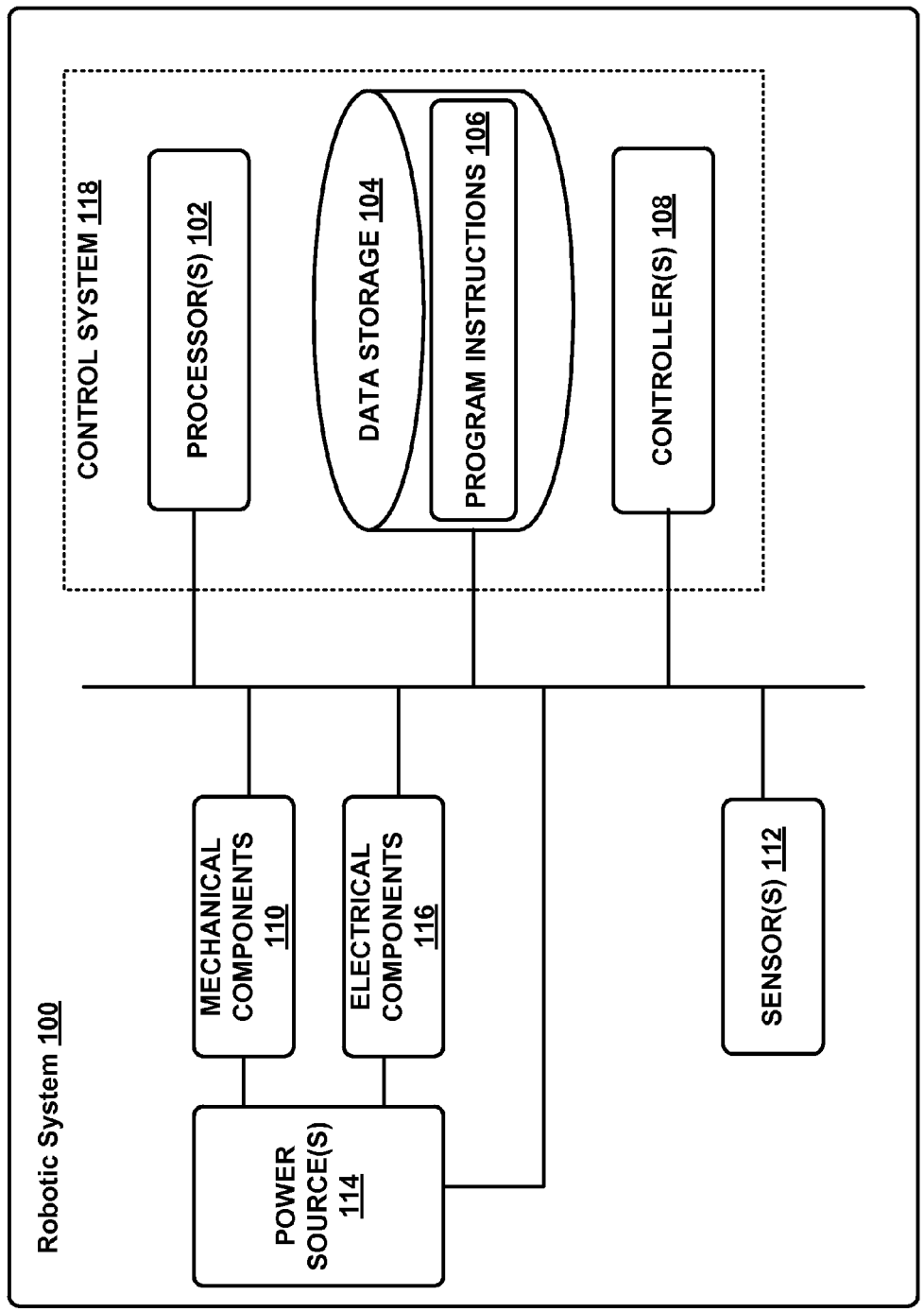
FIG. 1 illustrates a configuration of a robotic system, according to an example implementation.

Example apparatuses, systems and methods are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

A legged robotic device may have programming that, when executed by the control systems of the legged robotic device, may allow the legged robotic device to move about on its legs while maintaining its balance. An example legged robotic device may be a bipedal robot having two legs, a quadruped robot having four legs, among other possibilities. In the examples described below, the legged robot device's programming may enable the legged robotic device to walk, trot, or run in a given direction on a range of ground surfaces with different slopes or friction coefficients.

For a given step in the gait of an example legged robotic device, the legged robotic device may determine a desired force allocation for each of its feet. The force allocation process may determine one or more of a desired vertical force on the feet, and desired shear forces in the forward and lateral directions. Each of these component forces may be allocated based on the current requirements of the legged robotic device to support the weight of the robotic device, correct any detected gait errors, and to generally maintain balance of the robotic device.

An example legged robotic device may additionally include programming to detect its mass distribution from time to time. As the mass distribution of the legged robotic device changes, the legged robotic device may adapt various gait parameters to accommodate these changes, such as the vertical force applied to the feet, and shear forces in the forward and lateral directions, as examples.

As a particular example, a legged robotic device may be configured to carry various loads. Such loads may be applied to the legged robotic device in a manner such that the load is lopsided. A lopsided load on the legged robotic device may cause an unstable gait, particularly if an external load is added onto the legged robotic device. The legged robotic device may be configured to recalculate its mass distribution estimation, and subsequently adapt to the lopsided load. For example, if the mass distribution shifts forward, the robotic device may subsequently push harder with its front legs to maintain a desired pitch.

The legged robotic device may further calculate an updated moment of inertia if the mass of the robotic device changes. The moment of inertia represents the mass property of the legged robotic device that determines the torque needed for a desired angular acceleration about an axis of rotation. For example, the legged robotic device may detect an increase in a load, and may subsequently update its moment of inertia calculation, and use the updated moment of inertia to scale up gains on the appropriate legs to push harder and adjust pitch.

It should be understood that the above examples are provided for illustrative purposes, and should not be construed as limiting. As such, the method may additionally or alternatively includes other features or includes fewer features, without departing from the scope of the invention.

II. EXAMPLE ROBOTIC SYSTEMS

Referring now to the figures, FIG. 1 illustrates an example configuration of a robotic system. The robotic system 100 represents an example robotic system configured to perform the implementations described herein. Additionally, the robotic system 100 may be configured to operate autonomously, semi-autonomously, and/or using directions provided by user(s), and may exist in various forms, such as a biped robot or a quadruped robot, among other examples. Furthermore, the robotic system 100 may also be referred to as a robotic device, legged robotic device, mobile robot, or robot, among others.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes, and may include more or less components within various examples. The components of robotic system 100 may be connected in any manner, including wired or wireless connections, etc. Further, in some examples, components of the robotic system 100 may be positioned on multiple entities rather than a single entity. Other example illustrations of robotic system 100 may exist.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide some of the functionality of controller(s) 108, where the controller(s) 108 may be configured to cause activation and deactivation of the mechanical components 110 and the electrical components 116.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 may include at least one controller 108, which may interface with the robotic system 100. The controller 108 may serve as a link between portions of the robotic system 100, such as a link between mechanical components 110 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The example interfaces and communications noted above may be implemented via a wired or wireless connection, or both. The controller 108 may perform other functions for the robotic system 100 as well. Other examples of controllers may exist.

Mechanical components 110 represent possible hardware of the robotic system 100 that may enable the robotic system 100 to operate. As a few examples, the robotic system 100 may include actuator(s), extendable leg(s) ("legs"), arm(s), wheel(s), one or more feet coupled to the legs, one or more structured bodies for housing the computing system or other components, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100 and its environment. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the legs.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by control system 118 of the robotic system 100.

The sensor(s) 112 may provide information indicative of the environment of the robot for the control system 118 to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes RADAR, LIDAR, SONAR, VICON®, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor (s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, feet, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. In such an example, the robotic system 100 may include a gas tank to store gasoline used to power the gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100 within examples.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

Figure 2:
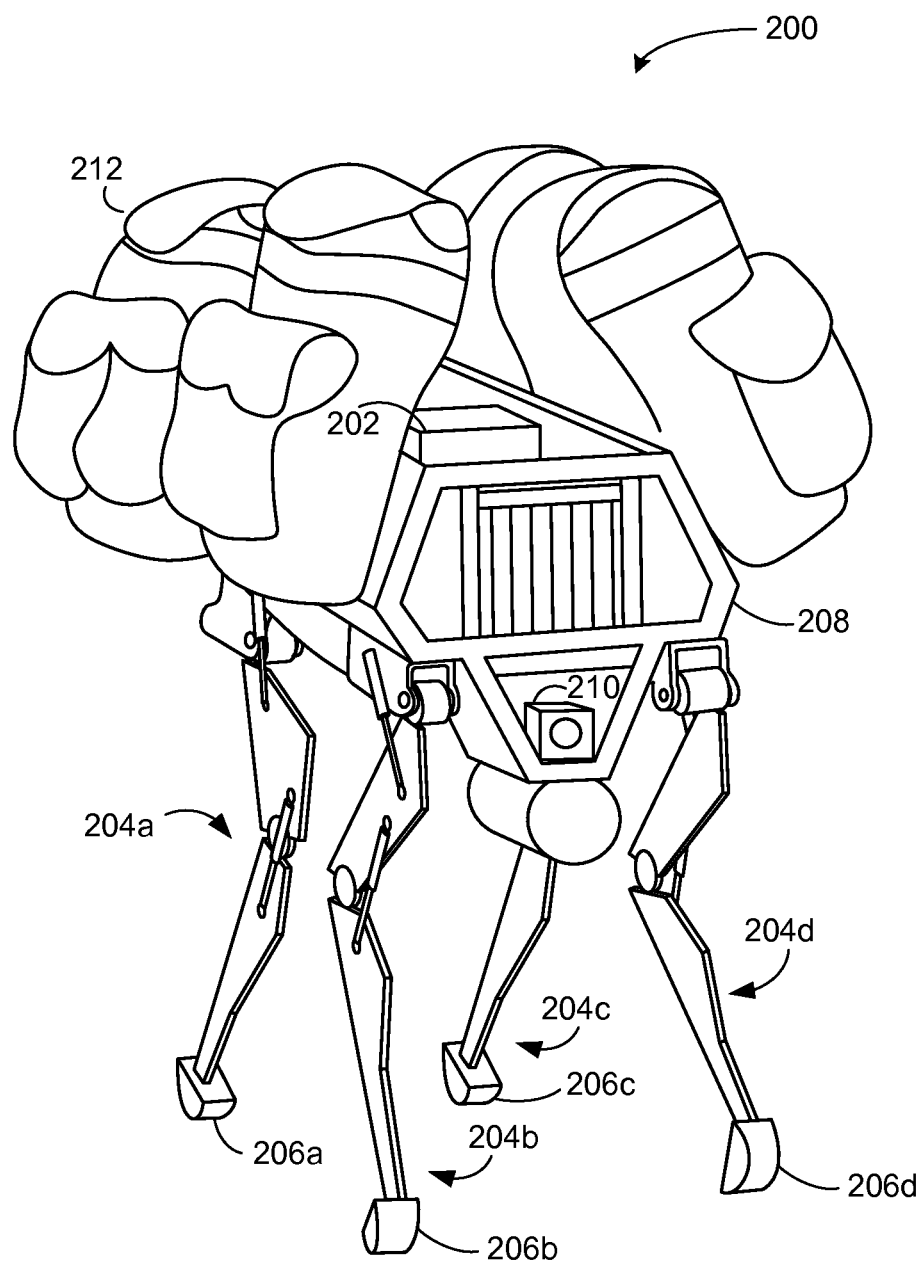
FIG. 2 illustrates a quadruped robotic device, according to an example implementation.

FIG. 2 illustrates an example quadruped robot 200, according to an example implementation. Among other possible functions, the robot 200 may be configured to perform some of the methods described herein during operation. The robot 200 includes a control system 202, and legs 204a, 204b, 204c, 204d connected to a body 208. Each leg may include a respective foot 206a, 206b, 206c, 206d that may contact the ground surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. To operate, the robot 200 includes a computing system that may be made up of one or more computing devices configured to assist in various operations of the robot 200, which may include processing data and providing outputs based on the data. The computing system may process information provided by various systems of the robot 200 (e.g., a sensor system) or from other sources (e.g., a user, another robot, a server) and may provide instructions to the systems to operate in response.

Additionally, the computing system may monitor systems of the robot 200 during operation, to determine errors and/or monitor regular operation, for example. In some example configurations, the computing system may serve as a connection between the various systems of the robot 200 that coordinate the operations of the systems together to enable the robot 200 to perform functions. Further, although operations described herein correspond to a computing system of a robot performing tasks, the computing system may be made of multiple devices, processors, controllers, and/or other entities configured to assist in the operation of the robot. Additionally, the computing system may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits. The robot 200 may use one or more gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap. The gaits may be classified based on footfall patterns—the locations on the ground surface for the placement the feet 206a-206d. Similarly, gaits may also be classified based on mechanics.

One or more systems of the robot 200, such as the control system 118, may be configured to operate the legs 204a-204d to cause the robotic 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular operations that a given robot may have been designed to perform. For example, a robot developed to carry heavy loads may have a wide body that enables placement of the loads. Similarly, a robot designed to reach high speeds may have a narrow, small body that does not have substantial weight. Further, the body 208, as well as the legs 204, may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 is positioned on the front of the body 208, but may be placed at other positions of the robot as well. Further, the sensor(s) 210 may include one or more of those sensor(s) 112 discussed above in relation to FIG. 1.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 200 may be configured. The robot 200 may be configured to perform other operations as well.

During operation, a computing system of the robot 200 may communicate with other systems of the robot 200 via wired or wireless connections and may further be configured to communicate with one or more users of the robot 200. As one possible illustration, the computing system may receive an input from a user indicating that the user wants the robot to perform a particular gait in a given direction. The computing system may process the input and may perform an operation that may cause the systems of the robot to perform the requested gait.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process various types of inputs.

Figure 3:
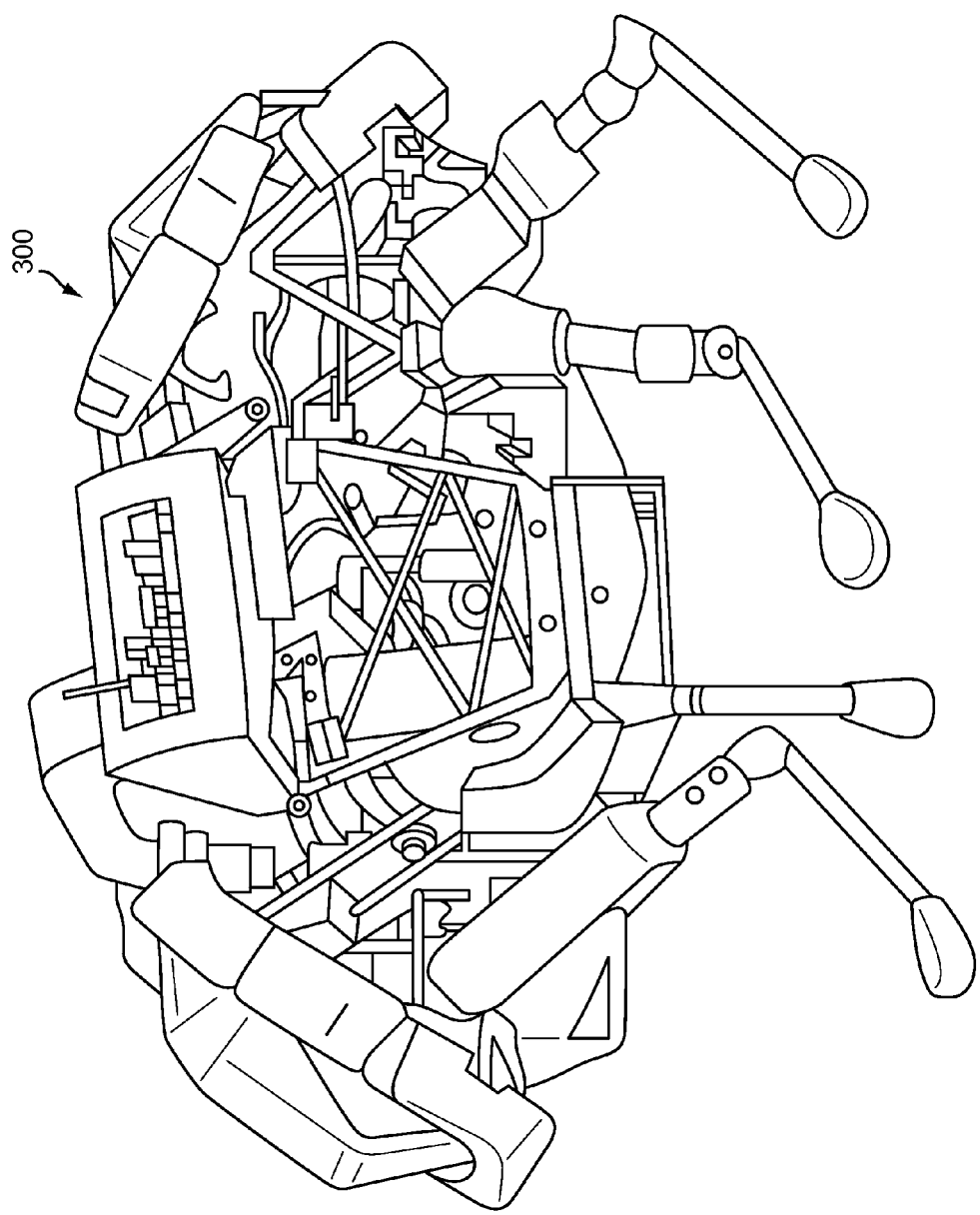
FIG. 3 illustrates another quadruped robotic device, according to an example implementation.

FIG. 3 illustrates another quadruped robot 300 according to an example implementation. Similar to robot 200 shown in FIG. 2, the robot 300 may correspond to the robotic system 100 shown in FIG. 1. The robot 300 serves as another possible example of a robot that may be configured to perform some of the implementations described herein.

Figure 4:
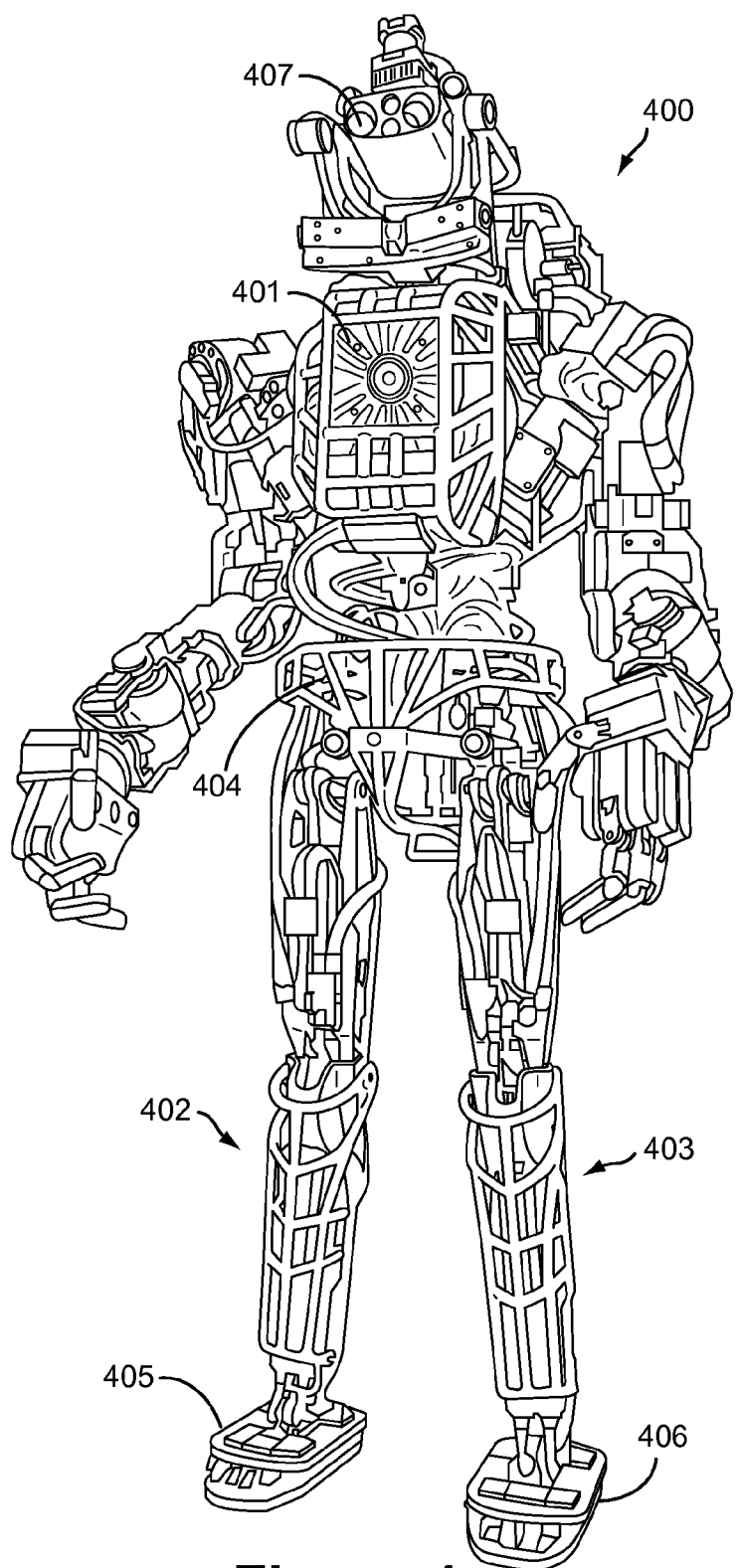
FIG. 4 illustrates a biped robotic device, according to an example implementation.

FIG. 4 illustrates a biped robot 400 according to another example implementation. Similar to robots 200 and 300 shown in FIGS. 2 and 3, the robot 400 may correspond to the robotic system 100 shown in FIG. 1, and may be configured to perform some of the implementations described herein. The robot 400 may include more or less components than those shown in FIG. 2 and discussed with respect to the robot 200. For example, the robot 400 may include a control system 401 and legs 402, 403 connected to a body 404. Each leg may include a respective foot 405, 406, that may contact the ground surface. The robot 400 may also include sensors (e.g., sensor 407) configured to provide sensor data to the control system 401 of the robot 400.

III. EXAMPLE IMPLEMENTATIONS FOR ADJUSTING TO A LOAD ON A LEGGED ROBOTIC DEVICE

Example implementations are discussed below for adapting to a change in mass distribution in an example legged robotic device. As the mass distribution of the legged robotic device changes, the legged robotic device may adapt various gait parameters, such as the vertical force applied to the feet, and shear forces in the forward and lateral directions, as examples.

Further, the term ground surface as used herein is meant to encompass any possible surface or terrain that the robot may encounter, and is not meant to be limiting. For instance, the ground surface may be indoors or outdoors, may be rigid or loose, such as sand or gravel, and may include discontinuities or irregularities such as stairs, rocks, fallen trees, debris, and the like. Numerous other examples exist.

Figure 5:
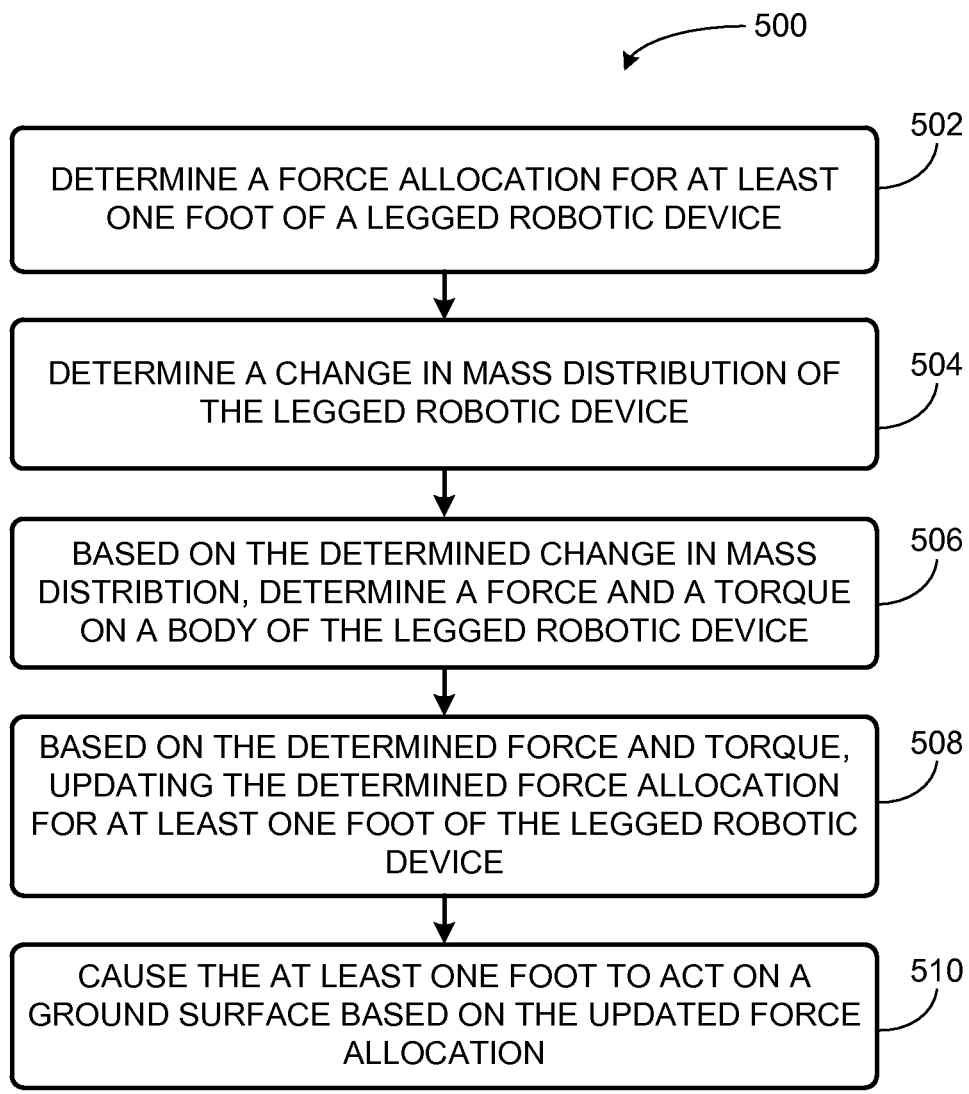
FIG. 5 is a flowchart according to an example implementation.

FIG. 5 is flowchart 500, according to example implementations. The implementations may be carried out by one or more of the robotic systems as described above in relation to FIGS. 1-4. Flowchart 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the flowchart 500 and other procedures and operations disclosed herein, the block diagram illustrates a possible implementation. In this regard, each block may represent a module, a segment, or a portion of program code, which includes one or more instructions executable by a processor or computing device for implementing specific logical operations. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, each block in FIG. 5 may represent circuitry that is wired to perform the specific logical operations.

At block 502, the flowchart 500 includes determining a force allocation for at least one foot of the legged robotic device. As discussed above in relation to FIGS. 1-4, an example legged robotic device includes two or more legs extending from a body of the legged robotic device. In addition, the two or more legs are coupled to the two or more feet, and wherein the at least one foot of the two or more feet is in contact with a ground surface. The legged robotic device as described herein is a biped robot with two feet; however the operations may also be applicable to robots with a different number of feet, such as a quadruped robot with four feet, among other examples. Further, the operations discussed below may be performed by a robot that is walking, trotting, or running Other gaits are also possible.

Figure 6A:
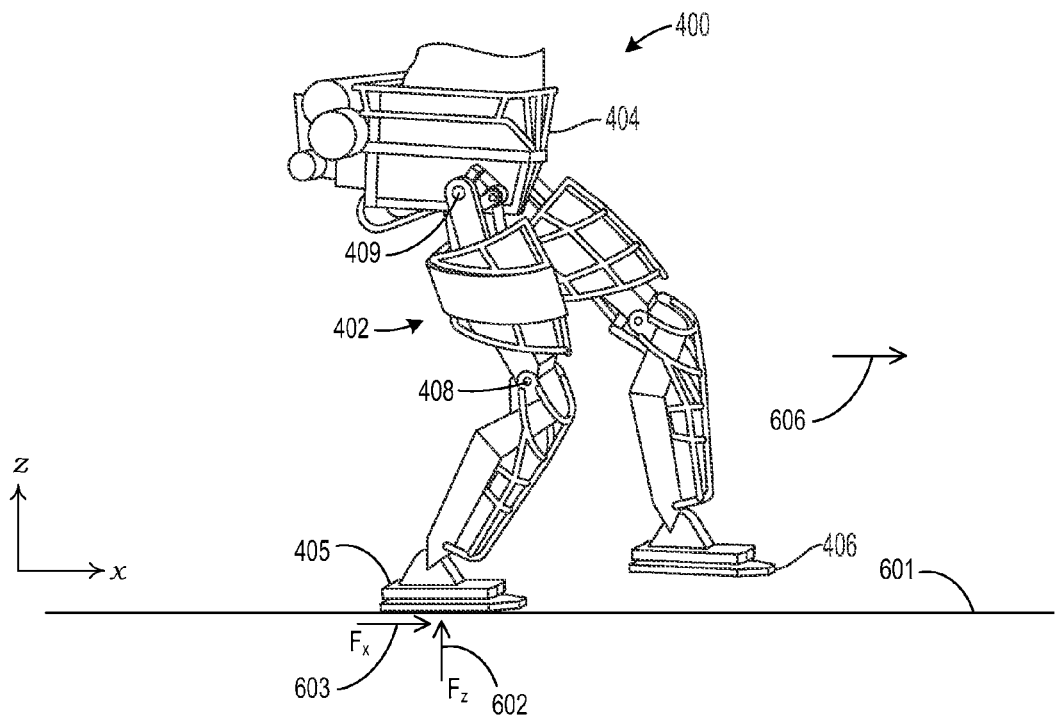
FIG. 6A illustrates a side view of a foot of a robotic device in contact with a ground surface, according to an example implementation.
Figure 6B:
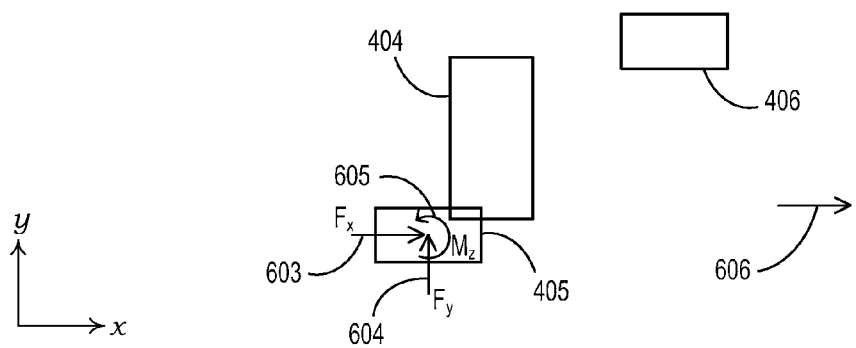
FIG. 6B illustrates a top view of a foot of a robotic device in contact with a ground surface, according to an example implementation.

FIG. 6A illustrates a side view and FIG. 6B illustrates a top view of the example biped robot 400 in a walking gait. The robot's right foot 405 is in contact with a ground surface 601, in a "stance" state, while the left foot 406 is in a "swing" state, not contacting the ground surface 601. The direction of movement 606 is shown in both FIGS. 6A and 6B. For clarity, the top view in FIG. 6B shows only the feet 405, 406 and the body 404 as a simplified block diagram. Other gaits and other relative positions for the feet of the robot 400 are also possible.

The robot 400 may include six degrees of freedom with respect to its body 404, or possible directions of movement, including forward (x-axis), lateral (y-axis), and vertical (z-axis) translations, as well as roll (x-axis), pitch (y-axis), and yaw (z-axis) rotations. The robot 400 may control movements in each of these six directions by determining how to allocate the ground reaction force that acts upon the foot 405 among several component forces.

For example, referring to FIGS. 6A and 6B, the determined force allocation for the foot may include a vertical force component 602 ($F_z$, applied along the z-axis), a forward shear force component 603 ($F_x$, applied along the x-axis), a lateral shear force component 604 ($F_y$, applied along the y-axis), and a yaw moment component 605 ($M_z$, applied about the z-axis). The determination of how to allocate the ground reaction force among these component forces, including what magnitudes to assign each component force, may be based on the current needs of the robot 400 to, for instance, support the robot's weight, correct any detected gait errors (e.g., slips, collisions, lopsided load, etc.), and to generally maintain the robot's posture and balance.

In some cases, the robot 400 may determine a relative control priority for each of the six degrees of freedom and then base the determination of the force allocation for the foot on the relative control priorities. For example, if the robot 400 detects a pitch error, such as the robot 400 leaning too far forward, the robot 400 may prioritize pitch control over the control of the robot's other degrees of freedom, in order to prevent the robot 400 from falling over.

At block 504, the flowchart 500 includes determining a change in mass distribution of the legged robotic device. As discussed above, the legged robotic device may include one or more force sensors arranged to measure load on various components of the robotic device. In an example, the sensor(s) may include one or more force sensors on each leg. Such force sensors on the legs may measure the load on the actuators that move one or more members of the legs.

In another example, the legged robotic device may further include one or more velocity and/or acceleration sensors. For instance, the sensor(s) may include an IMU. The velocity and acceleration determined by the IMU may be translated to the legged robotic device, based on the location of the IMU in the legged robotic device and the kinematics of the legged robotic device.

The sensors may output data to one or more processors of the legged robotic device, which may translate the force sensor data to determine a mass distribution. The legged robotic device may calculate its mass distribution from time to time, and the legged robotic device may store the mass distribution data in its data storage. As a specific example, the legged robotic device calculates its mass distribution every 5 seconds. As another example, the legged robotic device calculates its mass distribution every millisecond. As yet another example, the legged robotic device calculates its mass distribution in response to sensor data. Each time the legged robotic device determines its mass distribution, the legged robotic device may compare a current center of mass determination with the center of mass location stored in its data storage. If the current center of mass determination is different than the stored center of mass, the legged robotic device may make the determination that a change in the mass distribution has occurred.

The mass distribution may change due to a variety of circumstances. As discussed above, an example legged robotic device may be configured to carry a load on its body. In such a configuration, the determined change in mass may represent a detection of the weight of an object at least partially carried by the legged robotic device. For example, a heavy object may be positioned on a front portion of the legged robotic device, resulting in a change in the mass distribution. In another example, the determined change in mass may represent a detection of a removal an object at least partially carried by the legged robotic device. Using the example described above, if the heavy object is removed from the front portion of the legged robotic device, the mass distribution would shift back towards the middle of the legged robotic device.

In another example, the mass distribution may change without the addition of an external load to the legged robotic device. As discussed above, an example legged robotic device may be powered by a gasoline engine. In such an example, the legged robotic device may include a gas tank to store gasoline used to power the gasoline engine. As the legged robotic device burns fuel in the gas tank, the mass distribution may change. For example, if the gas tank is positioned near the rear of the legged robotic device, the mass distribution may shift towards the front of the device as fuel is burned and the tank empties.

At block 506, the flowchart 500 includes determining a force and a torque on the body of the legged robotic device based on the determined change in mass distribution. The force may include a gravitational force corresponding to a load on the body of the legged robotic device. The torque includes at least one of a pitch component (around the x-axis) and a roll component (around the y-axis). For example, if a load is placed on a front portion of the legged robotic device, the mass distribution may shift forward, and the legged robotic device may determine a torque having a pitch component around the y-axis. In another example, if a load is placed one side of the legged robotic device, the mass distribution may shift to that side, and the legged robotic device may determine a torque having a roll component around the x-axis. Further, in some examples the torque may include a yaw component (around the z-axis). Various combinations of a roll component, a pitch component, and a yaw component for the torque are possible as well.

The robot 400 may detect, via one or more sensors, a torque on the body 404 with respect to the ground surface 601. The one or more sensors may include force and position sensors in the leg 402 of the robot 400. The sensors may detect and relay position and velocity data to a control system, and possibly other systems, of the robot 400. For example, the one or more sensors may include one or more sensors 408 located in a knee joint of the leg 402 that detect the movements of the knee joint, and one or more sensors 409 located in a hip joint of the leg 402 that detect movements of the hip joint. Such sensors may estimate a ground force that may be used to determine the torque on the body 404 with respect to the ground surface 601. Other sensors may be included as well, and the location of these sensors on the robot 400 may be varied.

The one or more sensors may further include one or more IMUs that may detect the robot's velocity and acceleration in the world frame, where the z-axis is aligned with the gravity vector. For instance, an IMU may be located within the body 404 of the robot 400. The IMU may include a three-axis accelerometer and a three-axis gyroscope that may detect accelerations and velocities of the body 404 in three coordinate directions. Accordingly, the robot 400 may integrate the angular velocity detected by the gyroscope to determine a force on the body 404 with respect to the ground surface 601. Other sensors and other detections that are not based on the foot 405 of the robot 400 in contact with the ground surface 601 are also possible.

At block 508, the flowchart includes updating the determined force allocation for at least one foot of the legged robotic device based on the determined torque. As discussed above in relation to FIGS. 6A and 6B, the determined force allocation for the at least one foot may include a vertical force component 602 ($F_z$, applied along the z-axis), a forward shear force component 603 ($F_x$, applied along the x-axis), a lateral shear force component 604 ($F_y$, applied along the y-axis), and a yaw moment component 605 ($M_z$, applied about the z-axis). In one example, updating the determined force allocation for the at least one foot comprises increasing at least one of (i) the forward shear force component, (ii) the lateral shear force component, or (iii) the vertical force component. In another example, updating the determined force allocation for the at least one foot comprises decreasing at least one of (i) the forward shear force component, (ii) the lateral shear force component, or (iii) the vertical force component. In yet another example, updating the determined force allocation for the at least one foot comprises increasing at least one of (i) the forward shear force component, (ii) the lateral shear force component, or (iii) the vertical force component for one foot of the legged robotic device, and decreasing at least one of (i) the forward shear force component, (ii) the lateral shear force component, or (iii) the vertical force component for another foot of the legged robotic device. Further, the legged robotic device may assign a distinct force allocation to each of its two or more feet. For example, in a quadruped robotic device, each of the four feet may be assigned a different force allocation in response to the determined torque.

In some cases, the legged robotic device may determine a relative control priority for each of the six degrees of freedom and then base the determination of the updated force allocation for the at least one foot on the relative control priorities. For example, if the legged robotic device detects a pitch error, such as the legged robotic device leaning too far forward, the legged robotic device may prioritize pitch control over the control of the robot's other degrees of freedom, in order to prevent the legged robotic device from falling over.

In another example implementation, the legged robotic device may further determine a change in mass of the legged robotic device, using the one or more sensors described above. In such an example, updating the determined force allocation for the at least one foot may be further based on the determined change in mass. For example, the robotic device may increase a vertical normal force component for the at least one foot in response to an increase in the mass of the legged robotic device. Further, the legged robotic device may estimate a moment of inertia of the legged robotic device based on the determined change in mass. In such an example, updating the determined force allocation for the at least one foot may be further based on the estimated moment of inertia.

Further, the legged robotic device may determine the updated force allocation for the at least one foot based on a relationship between the mass of the legged robotic device and the change in mass distribution of the legged robotic device. As a specific example, the updated force allocation (F) for a given foot of the legged robotic device may be determined by calculating a current mass of the legged robotic device (m), and a change in mass distribution in the x,y plane ($\Delta COM_{x,y}$). In such an example, the updated force allocation for a given foot of the legged robotic device may be represented by the following relationship: $F = f(m * \Delta COM_{x,y})$. Thus, the greater the change in mass distribution, the greater the change in updated force allocation for a given foot to compensate the change in mass distribution to keep the legged robotic device in a balanced stance.

At block 510, the flowchart includes causing the at least one foot to act on the ground surface based on the updated force allocation. For instance, by controlling the actuation and position of its leg 402, the robot 400 may control the forces exerted by the foot 405 on the ground surface 601, and thereby control the components of the ground reaction force that act upon the foot 405. As discussed above, the legs of the legged robotic device may include one or more actuators. In such an example, causing the at least one foot to act on the ground surface based on the updated force allocation comprises adjusting a torque applied by the one or more actuators. Such actuators may include electric motors, hydraulic linear actuators, or other types of actuators.

Figure 7A:
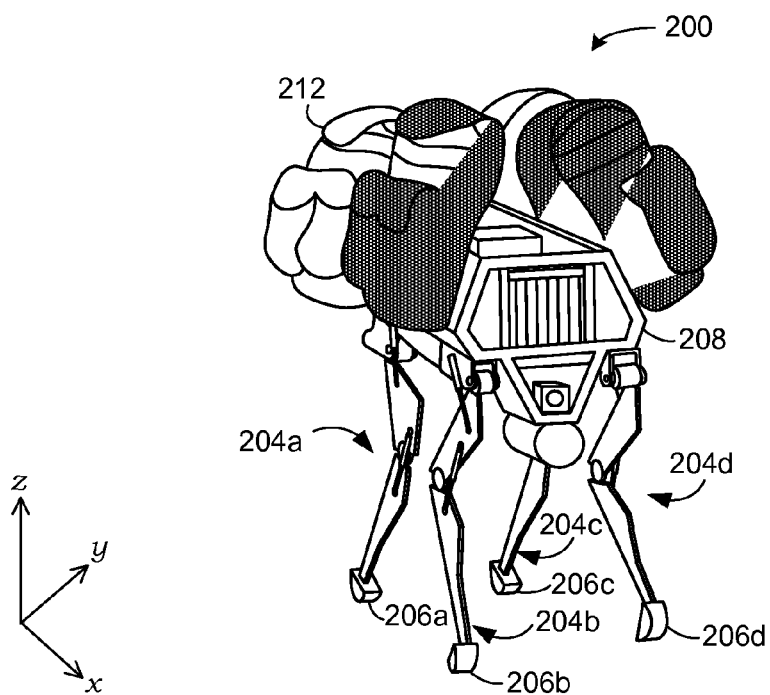
FIGS. 7A-7B illustrate an example robotic device configured to perform operations, in accordance with at least some embodiments described herein.
Figure 7B:
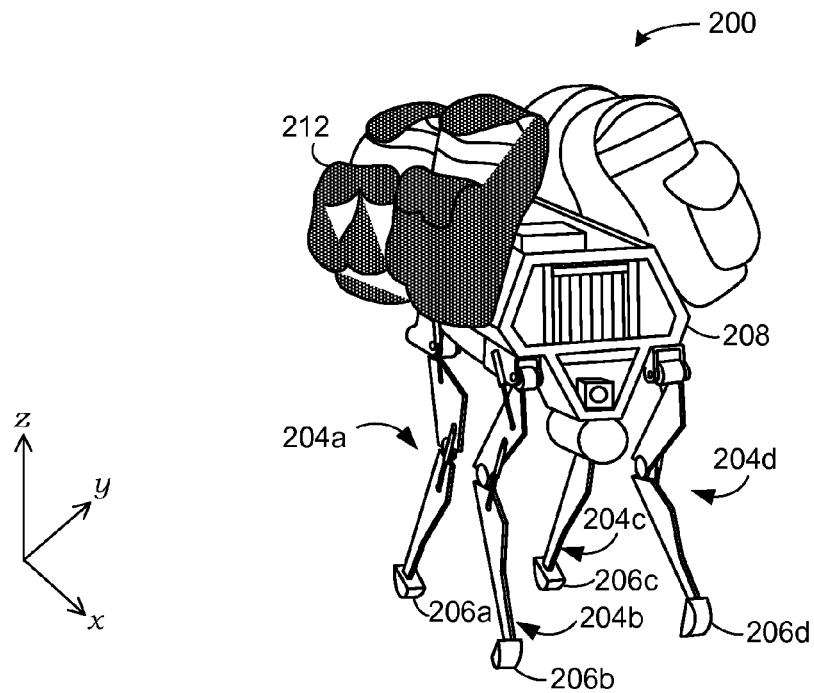

FIGS. 7A-7B illustrate an example robotic device 200 performing various functions, according to example embodiments. FIG. 7A illustrates an example legged robotic device configured to perform example operations. As shown in FIG. 7A, a load may be added to the two containers positioned on a front portion of the robotic device 200. As the load is placed on a front portion of the legged robotic device 200, the robotic device 200 may determine a change in mass distribution. In particular, the robotic device 200 may detect that that mass distribution shifted forward. In response, the legged robotic device 200 may determine a torque having a pitch component around the y-axis, as discussed above. The robotic device 200 may subsequently update the determined force allocation to compensate for the torque by increasing the vertical force component for the two front feet 206b, 206d.

Similarly, FIG. 7B illustrates another example scenario. As shown in FIG. 7B, a load may be added to the two containers positioned on a side of the robotic device 200. As the load is placed on the side of the legged robotic device 200, the robotic device 200 may determine a change in mass distribution. In particular, the robotic device 200 may detect that that mass distribution shifted nearer the side on which the load was positioned. In response, the legged robotic device 200 may determine a torque having a roll component around the x-axis, as discussed above. The robotic device 200 may subsequently update the determined force allocation for the at least one foot to compensate for the torque by increasing the vertical force component for the two side feet 206a, 206b. As such, both forward and lateral forces and torques can be compensated for, ensuring that the robotic device 200 remains in a balanced and upright position.

IV. CONCLUSION

Arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Further, the terminology used herein is for the purpose of describing particular implementations only, and is not intended to be limiting.

We claim:

1. A method operable by a legged robotic device, the method comprising:
    determining a force allocation for each foot of the legged robotic device for a gait of the legged robotic device, wherein the legged robotic device includes four legs extending from a body of the legged robotic device, wherein the four legs are coupled to four feet, and wherein at least one foot of the four feet is in contact with a ground surface;

causing each foot to act on the ground surface based on its respective determined force allocation during a first plurality of steps in the gait of the legged robotic device;

determining a change in mass distribution of the legged robotic device, wherein the change in mass distribution comprises detecting an addition or a removal of an object at least partially carried by the legged robotic device;

based on the determined change in mass distribution, determining a force and a torque on the body of the legged robotic device with respect to the ground surface, wherein the determined torque includes at least one of a pitch component and a roll component;

based on the determined force and torque, updating the determined force allocation for each foot of the four feet for the gait of the legged robotic device, wherein each of the four feet are assigned a different force allocation in response to the determined force and torque; and causing each foot to act on the ground surface based on its respective updated force allocation during a second plurality of steps in the gait of the legged robotic device.

2. The method of claim 1, wherein the legged robotic device further comprises six degrees of freedom, the method further comprising:
determining a relative control priority for each of the six degrees of freedom; and
updating the determined force allocation for each foot based on the relative control priorities.

3. The method of claim 1, wherein the legged robotic device includes an inertial measurement unit (IMU) including an accelerometer and a gyroscope, and wherein the IMU outputs data for determining the change in mass distribution of the legged robotic device.

4. The method of claim 1, wherein updating the determined force allocation for each foot comprises increasing at least one of (i) a forward shear force component for each foot, (ii) a lateral shear force component for each foot, (iii) a vertical normal force component for each foot, or (iv) a yaw moment component for each foot.

5. The method of claim 1, wherein each of the four robotic legs comprises one or more actuators, and wherein causing each foot to act on the ground surface based on the updated force allocation comprises adjusting a force or a torque applied by the one or more actuators.

6. A non-transitory computer readable medium having stored thereon instructions, that when executed by one or more processors, cause a legged robotic device to perform operations comprising:
determining a force allocation for each foot of the legged robotic device for a gait of the legged robotic device, wherein the legged robotic device includes four legs extending from a body of the legged robotic device, wherein the four legs are coupled to four feet, and wherein at least one foot of the four feet is in contact with a ground surface;
causing each foot to act on the ground surface based on its respective determined force allocation during a first plurality of steps in the gait of the legged robotic device;
determining a change in mass distribution of the legged robotic device, wherein the change in mass distribution comprises detecting an addition or a removal of an object at least partially carried by the legged robotic device;
based on the determined change in mass distribution, determining a force and a torque on the body of the legged robotic device with respect to the ground surface, wherein the determined torque includes at least one of a pitch component and a roll component;
based on the determined force and torque, updating the determined force allocation for each foot of the four feet for the gait of the legged robotic device, wherein each of the four feet are assigned a different force allocation in response to the determined force and torque; and
causing each foot to act on the ground surface based on its respective updated force allocation during a second plurality of steps in the gait of the legged robotic device.

7. The non-transitory computer readable medium of claim 6, wherein each of the four robotic legs comprises one or more actuators, and wherein causing each foot to act on the ground surface based on the updated force allocation comprises adjusting a force or a torque applied by the one or more actuators.

8. The non-transitory computer readable medium of claim 6, wherein the legged robotic device further comprises six degrees of freedom, and wherein the operations further comprise:
determining a relative control priority for each of the six degrees of freedom; and
updating the determined force allocation for each foot based on the relative control priorities.

9. The non-transitory computer-readable medium of claim 6, wherein updating the determined force allocation for each foot comprises increasing at least one of (i) a forward shear force component for each foot, (ii) a lateral shear force component for each foot, (iii) a vertical normal force component for each foot, or (iv) a yaw moment component for each foot.

10. A robotic system comprising:
four legs connected to a main body;
four feet coupled to the four legs, wherein at least one foot of the four feet is in contact with a ground surface;
one or more processors;
a plurality of actuators; and
data storage including program instructions stored thereon that when executed by the one or more processors of the robotic system, cause the robotic system to:
determine a force allocation for each foot of the four feet of the robotic system for a gait of the robotic system;
cause each foot to act on the ground surface based on its respective determined force allocation during a first plurality of steps in the gait of the robotic system;
determine a change in mass distribution of the robotic system, wherein the change in mass distribution comprises detecting an addition or a removal of an object at least partially carried by the robotic system;
based on the determined change in mass distribution, determine a force and a torque on the body of the robotic system with respect to the ground surface, wherein the determined torque includes at least one of a pitch component and a roll component;
based on the determined force and torque, update the determined force allocation for each foot of the four feet for the gait of the robotic system, wherein each of the four feet are assigned a different force allocation in response to the determined force and torque; and cause each foot to act on the ground surface based on its respective updated force allocation during a second plurality of steps in the gait of the robotic system.

11. The robotic system of claim 10, further comprising an inertial measurement unit (IMU) including an accelerometer and a gyroscope, and wherein the IMU outputs data for determining the change in mass distribution of the robotic system.

12. The robotic system of claim 10, wherein the plurality of actuators control the four legs, and wherein causing each foot to act on the ground surface based on the updated force allocation comprises adjusting a force and a torque applied by the plurality of actuators.

13. The robotic system of claim 10, wherein updating the determined force allocation for each foot comprises increasing at least one of (i) a forward shear force component for each foot, (ii) a lateral shear force component for each foot, (iii) a vertical normal force component for each foot, or (iv) a yaw moment component for each foot.

* * * * *